(12) United States Patent
Karn et al.

(10) Patent No.: US 7,415,455 B2
(45) Date of Patent: Aug. 19, 2008

(54) SELF-HEALING RDBMS OPTIMIZER

(75) Inventors: Holger Karn, Aidlingen (DE); Bryan F. Smith, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 205 days.

(21) Appl. No.: 11/457,971

(22) Filed: Jul. 17, 2006

(65) Prior Publication Data
US 2007/0050330 A1   Mar. 1, 2007

(30) Foreign Application Priority Data
Aug. 24, 2005   (EP) ................... 05107770

(51) Int. Cl.
*G06F 17/30* (2006.01)
*G06F 15/16* (2006.01)
(52) U.S. Cl. .................... 707/2; 707/3; 707/203
(58) Field of Classification Search ............ 707/1–6, 707/10, 100–102, 200, 203; 705/1, 20
See application file for complete search history.

(56) References Cited
U.S. PATENT DOCUMENTS
6,366,901 B1   4/2002   Ellis
6,438,537 B1 *   8/2002   Netz et al. ............ 707/3
6,847,978 B2 *   1/2005   Ellis et al. ............ 707/102
7,289,999 B2 *   10/2007  Ellis et al. ............ 707/100
7,302,422 B2 *   11/2007  Bossman et al. ........ 707/2
2004/0243555 A1*   12/2004   Bolsius et al. ........ 707/3

* cited by examiner

*Primary Examiner*—Don Wong
*Assistant Examiner*—Marc R Filipczyk
(74) *Attorney, Agent, or Firm*—Sawyer Law Group LLP

(57) ABSTRACT

A method, computer program product, and system for triggering an update of statistics data used by a query optimizer of a relational database management system for determining an optimal execution plan for executing a received query request on a relational database is provided. A system dependent nominal performance value for executing the query request on a database system is determined. Additionally, an average actual performance value is determined by processing the query request. If a comparison between the average actual performance value and the system dependent nominal performance value yields a result which is greater than a first threshold value, an update cost value and a cost saving value are determined. If a comparison between the cost saving value and the update cost value yields a result which is greater than a second threshold value, the statistics data is updated.

22 Claims, 6 Drawing Sheets

SELF-HEALING RDBMS OPTIMIZER

CROSS-REFERENCE TO RELATED APPLICATIONS

This application claims benefit under 35 U.S.C. § 119 of European Patent Application No. EP05107770, filed on Aug. 24, 2005, which is hereby incorporated by reference in its entirety for all purposes as if fully set forth herein.

FIELD OF THE INVENTION

The present invention is directed to computer databases. More particularly, the present invention is directed to triggering the update process of statistics data.

BACKGROUND OF THE INVENTION

Data in a relational database is organized in related two dimensional tables of columns and rows. A user accesses the data by defining a query request that is constructed in a query language, such as structured query language (SQL). FIG. 1 is a flow diagram 100 showing how a SQL query request 102 is processed by a relational database management system (RDBMS) 104. A SQL query request generally includes a sequence of SQL operations. A SQL operation is the smallest brick of a RDBMS and can be, for example, "reading data from disk" or "joining data from several locations." The RDBMS generates an execution plan for the SQL query request. The execution plan is a sequence of SQL operations that fulfills the objectives of the SQL query when processed on a database 114. There may be various execution plans that can fulfill the objectives of the SQL query request. Each execution plan, however, may have a different cost. The cost can, for instance, be evaluated in terms of computer processing unit (CPU) time required to execute the SQL query.

Most relational database management systems, such as DB2® from IBM® Corporation, generate statistics data 107. The statistics data contains information about the occurrence of values in columns and is used by a query optimizer 105 to determine an optimal execution plan 106 for the SQL query 102. The optimal execution plan is also a sequence of SQL operations, such as SQL operation i 108, SQL operation j 110, SQL operation k 112, etc.

The optimal execution plan is the execution plan by which the SQL query statement can be processed on the database with the minimum costs. Only statistics data which is up-to-date ensures that the selected execution plan for processing the SQL statement on the database is the optimal execution plan. Since data in a database may frequently change, the statistics data has to be updated regularly in order to reflect the changes to the data.

In existing systems, such as the DB2® database system for z/OS from IBM® Corporation, statistics data are updated by the database system in response to commands inputted by a database administrator. The database administrator may update the data on a regular basis, for example, within a maintenance window.

Generally, when the command to update statistics is issued, all statistics data is updated regardless of whether there has been a change to the underlying data that may impact the used statistics. This brute force method, however, may be inefficient and may require a significant amount of processing power. For this reason, the maintenance windows are usually scheduled for off-peak hours. As a consequence, a database may be accessed for a substantial period of time with execution plans developed from outdated statistics data, which could lead to less efficient access of data.

Other systems, for example, the DB2® universal database (UDB) system for Linux, UNIX, and Windows (LUW), contain a so-called learning optimizer (LEO), which updates the relevant statistics data after the execution of each SQL statement. This ensures that the statistics data is always up-to-date. Continuously updating the statistics data, however, requires substantial system resources. Therefore, the employment of a LEO might decrease database performance considerably.

For the reasons given above, neither manually updating statistics data, nor automatically updating statistics data as provided by a LEO, is ideal for database performance. In the following, patent documents that disclose more sophisticated ways of determining when to update statistics data are discussed briefly.

U.S. Pat. No. 6,366,901 discloses a system for automatically maintaining database statistics. According to the invention, for each table for which statistics are collected, a counter is maintained of the number of updates that are made to the columns for which statistics are being collected. When the counter reaches a modification threshold, the system automatically updates the statistics associated with the table. The disadvantage of this invention is that only the number of updates is counted. It may well be that the data changes, but the optimal execution plan determined from outdated statistics data remains the same. The statistics data may therefore be updated without any need and as a consequence, system resources would be wasted.

U.S. Pat. No. 6,389,430 discloses a system for collecting database object statistics by a database management system. The system selects one or more objects and correspondingly one or more object fields and then creates a base set of statistics data for the selected object fields. Each table in a database contains a log record. Each log record is a record of the changes that were made to its corresponding table, and can be used to rebuild a table in the event of a problem. The system reads active log records and updates the base set of statistics when a change is read in the active log records. The system begins extracting log records when an end-of-file of the active log records is reached, and updates the updated statistics data based on the extracted log records. The disadvantage of this invention is that the decision to update is based upon the log record. Changes made to a database may not necessarily require an update of the statistics data. Hence, triggering a statistics update based on log records may waste system resources.

Accordingly, there is a need for a method and system through which the update of statistics data can be triggered without wasting system resources.

SUMMARY OF THE INVENTION

In accordance with an aspect of the present invention, there is provided a method for triggering an update of statistics data used by a query optimizer of a relational database management system (RDBMS) for executing a query request which comprises at least one SQL operation on a relational database, whereby the relational database comprises at least one database table and a reference database table with up-to-date statistics data. A system independent reference value as well as a system dependent reference value are determined for each of the at least one SQL operation. A conversion factor that relates the system independent reference value to the system dependent reference value is calculated for each of the at least one SQL operation. A system independent nominal performance value is determined for each of the at least one SQL operation. Additionally, a system dependent nominal operator performance value is determined for each of the at least one SQL operation by use of the system independent nominal performance value and the conversion factor. For the query request, a system dependent nominal performance value is determined by use of the system dependent nominal operator performance value of each SQL operation. An actual performance value is measured by executing the query request on the at least one database table of the relational database. The number of times the query request is processed within a given period of time is tracked. An average actual performance value is determined from the measured actual performance values and the number of times the query request is executed within the given period of time. A comparison is carried out between the average actual performance value and the system dependent nominal performance value and an update cost value and a cost saving value are calculated for each of the at least one database table. The update cost value of each database table is compared with the cost saving value of each database table and an update of the statistics data is triggered.

In accordance with an embodiment of the invention, the system independent reference value and the system independent nominal performance value are defined by the number of iterations required to process the SQL operation on the reference database table and on the relational database, respectively. The number of iterations can be obtained from a request to the RDBMS.

In accordance with an implementation of the invention, the system dependent reference value, the system dependent nominal operator performance value, the system dependent nominal performance value, the actual performance value, the average actual performance value, the update cost value, and the cost saving value are determined in computer processing unit (CPU) time.

In accordance with one aspect of the invention, the comparison between the average actual performance value and the system dependent nominal performance value is carried out by taking the difference between the average actual performance value and the system dependent nominal performance value or by dividing the average actual performance value by the system dependent nominal performance value.

In accordance with one embodiment of the invention, only when the difference between the average actual performance value and the system dependent nominal performance value or the quotient between the average actual performance value and the system dependent nominal performance value is above a first threshold value are the remaining steps carried out. The first threshold value can be, for example, a constant that may be adapted by a database manager.

Using a comparison between the real time (e.g., average actual performance value in CPU-time) required to execute the query request and a predicted time (e.g., system dependent nominal performance value in CPU-time) to detect whether the statistics data is outdated is advantageous since an update of statistics data is only triggered if the query request is processed on the database in an inefficient way. No system resources are wasted by updating outdated statistics data that can still be employed by the query optimizer to develop effective execution plans.

In accordance with another aspect of the invention, the comparison between the cost saving value and the update cost value is made by taking the difference between the cost saving value and the update cost value or by dividing an average of the cost saving value by the update cost value.

In accordance with another embodiment of the invention, only when the difference between the cost saving value and the update cost value or the quotient between the average cost saving value and the update cost value is above a second threshold value are the remaining steps executed. The second threshold value can be, for instance, a constant that may be adapted by the database manager.

Triggering of a statistics data update based on a comparison between the cost saving value and the update cost value is advantageous since the statistics data is only updated if more system resources can be saved from updating the statistics than are required for the update process. Hence, the employment of this method to trigger the update of statistics data does not waste any system resources.

In another implementation, the invention relates to a computer program product which comprises computer executable instructions in order to perform the method.

In a further implementation, the invention relates to a system for triggering an update of statistics data used by a query optimizer of a relational database management system (RDBMS) for determining an optimal execution plan for executing a query request on a relational database.

BRIEF DESCRIPTION OF THE DRAWINGS

In the following, embodiments of the invention will be described in greater detail by way of example only making reference to the drawings in which.

DETAILED DESCRIPTION

Figure 1:
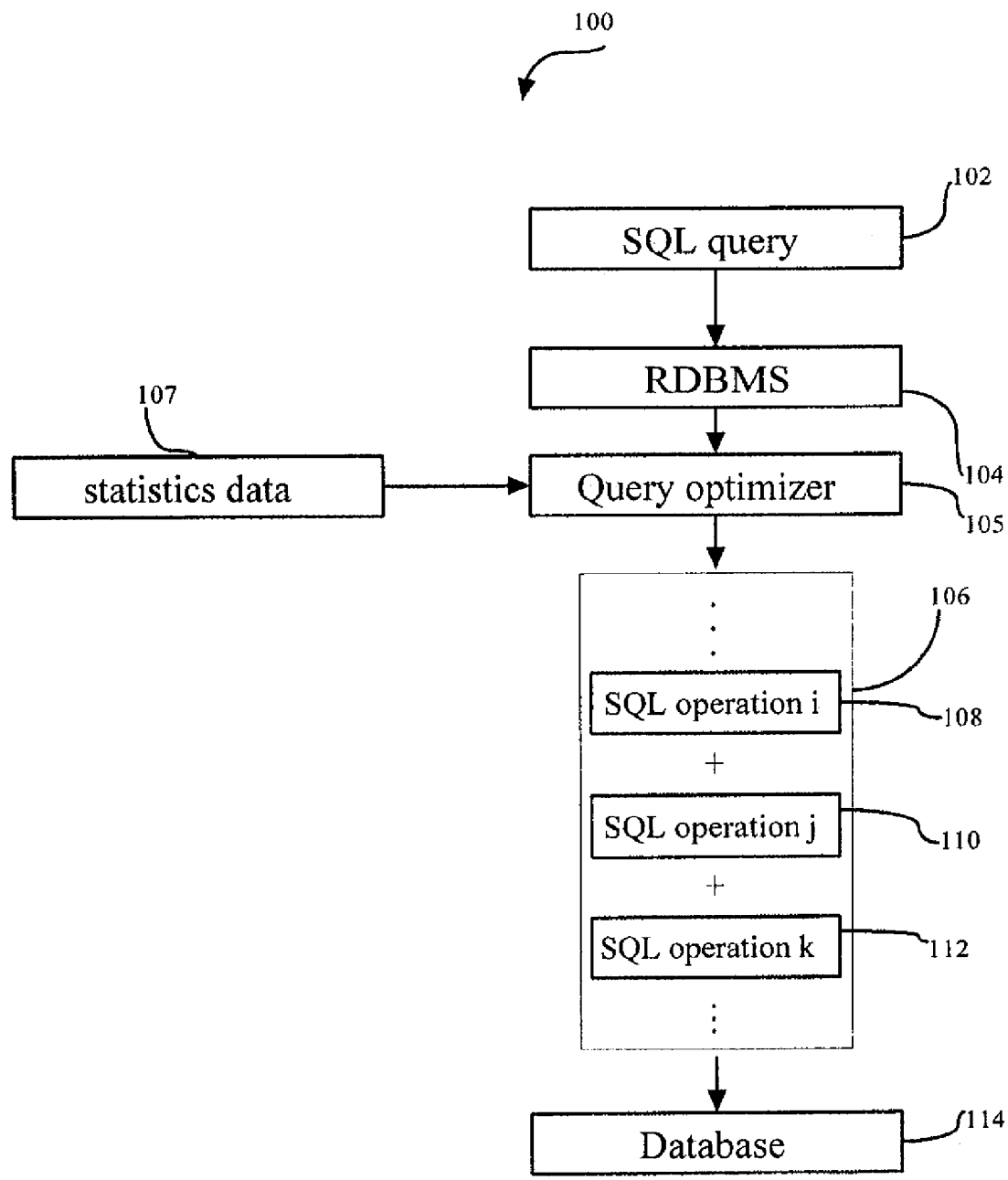
FIG. 1 is a flow diagram showing how a query request is processed by a RDBMS.

In the drawings and specification there has been set forth various embodiments of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

Embodiments of the present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. Implementations of the present invention can also be embedded in a computer program product, which comprises all the features enabling the implementation of the methods described herein, and which—when being loaded in a computer system—is able to carry out these methods.

Computer program means or computer program in the present context correspond to any expression, in any language, code or notation, of a set of instructions intended to cause a system having an information processing capability to perform a particular function either directly or after either or both of the following a) conversion to another language, code or notation; b) reproduction in a different material form.

Figure 2:
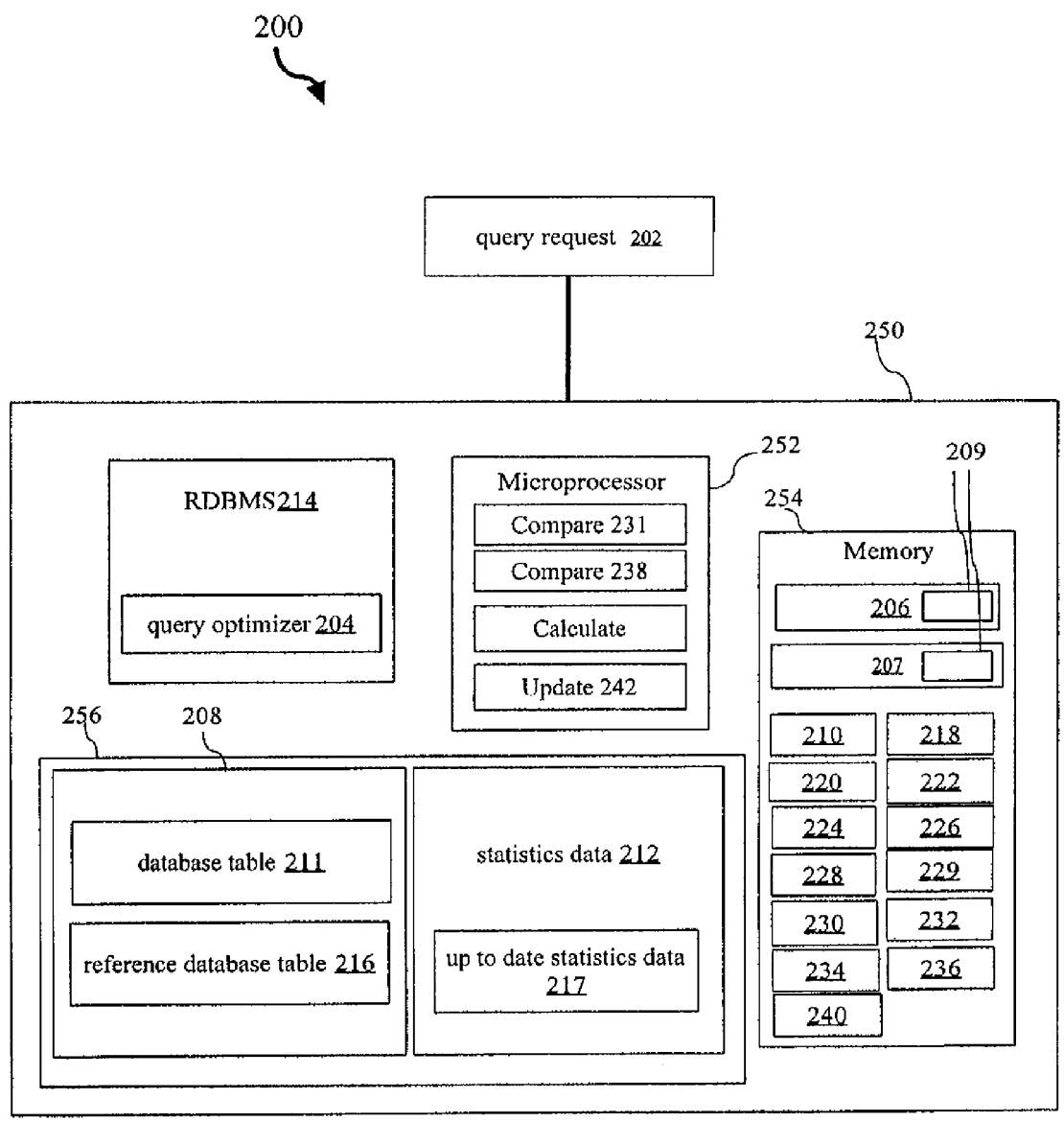
FIG. 2 is a block diagram of a system that implements an embodiment of the present invention.

FIG. 2 is a block diagram 200 of a database system 250, which implements one embodiment of the present invention. Database system 250 comprises a relational database management system (RDBMS) 214, at least one microprocessor 252, a volatile memory device 254, and a non-volatile memory device 256. The RDBMS 214 contains a query optimizer 204. The RDBMS 214 is a control system that supports database features including, but not limited to, storing data on memory medium 256, retrieving data from the memory medium 256, and updating data on the memory medium 256. The RDBMS 214 also generates statistics data 212, which is related to data stored in a relational database 208. In the relational database 208, data is organized in a two-dimensional column and row form called a table. The statistics data 212 is most likely stored together with the relational database 208 in the non-volatile memory medium 256. The relational database 208 comprises at least one database table 211 and a reference database table 216 with up-to-date statistics data 217. The non-volatile memory device 256 can be, for example, a hard disk or a tape drive. The volatile memory device 254 can be, for instance, a random access memory (RAM) device. The at least one microprocessor 252 is employed to process commands.

In order to access database table 211, the RDBMS 214 determines an execution plan 206 for a query request 202. Execution plan 206 comprises at least one SQL operation 209. A test execution plan 207, which comprises all possible SQL operations 209, is executed on reference database table 216. For each of the at least one SQL operation 209 comprised in the test execution plan 207, a system dependent reference value 222 is determined by measuring the CPU time required to execute the SQL operation on reference database table 216. For each of the at least one SQL operation 209 of the test execution plan 207, a system independent reference value 224 is determined by requesting the number of iterations required to execute the SQL operation 209 on reference database table 216 from the RDBMS 214. The RDBMS 214 determines the number of iterations using the up-to-date statistics data 217.

For each of the at least one SQL operation 209, a conversion factor 230 is determined. The conversion factor 230 relates the system independent reference value 224 to the system dependent reference value 222 of each of the at least one SQL operation 209. The conversion factor 230 of a SQL operation is calculated by, for example, dividing the system independent reference value 224 by the system dependent reference value 222. The conversion factor 230, the system dependent reference value 222, and the system independent reference value 224 of each of the at least one SQL operation 209 are stored on the volatile memory device 254.

For each of the at least one SQL operation 209 of the execution plan 206, a system independent nominal performance value 220 is determined by requesting the number of iterations required to execute the SQL operation on the relational database 208 from the RDBMS 214. A system dependent nominal operator performance value 229 is determined for each SQL operation 209 of the execution plan 206 using the corresponding conversion factor 230 and the system independent nominal performance value 220. Since the test execution plan 207 comprises all SQL operations of the execution plan 206, the corresponding conversion factor 230 of a specific SQL operation is available as it has already been determined. The system independent nominal performance value 220 of each SQL operation and the system dependent nominal operator performance value 229 of each SQL operation are stored on the volatile memory device 254.

A system dependent nominal performance value 228 of the query request 202 is then determined by summing the system dependent nominal operator performance value of each SQL operation comprised in the query request.

An actual performance value 218 is measured by executing the query request 202 on database 208. In one embodiment of the invention, the actual performance value 218 is measured by the microprocessor 252 in terms of CPU time. The CPU time required to execute each SQL operation comprised in query request 202 is measured, then by summing the measured values, the actual performance value 218 is obtained in terms of CPU time. The actual performance value 218 is stored in memory device 254. The number of times the query request 202 is executed over a given period of time is stored as value 210 in memory device 254. From the number of times 210 and the actual performance value 225, an average actual performance value 226 can be determined by the microprocessor 252. The average actual performance value 226 is also stored in memory device 254.

The microprocessor 252 calculates an update cost value 234 and a cost saving value 236 for each of the at least one database table 211. They are stored on memory device 254. A first threshold value 232 and a second threshold value 240 are also stored on memory device 254. One or both of the threshold values may be specified by a system administrator. The microprocessor 252 performs a comparison 238 between the update cost value 234 and the cost saving value 236. According to the result, the RDBMS 214 updates the statistics data 212. The various steps carried out by the system are described in detail in the following.

Figure 3:
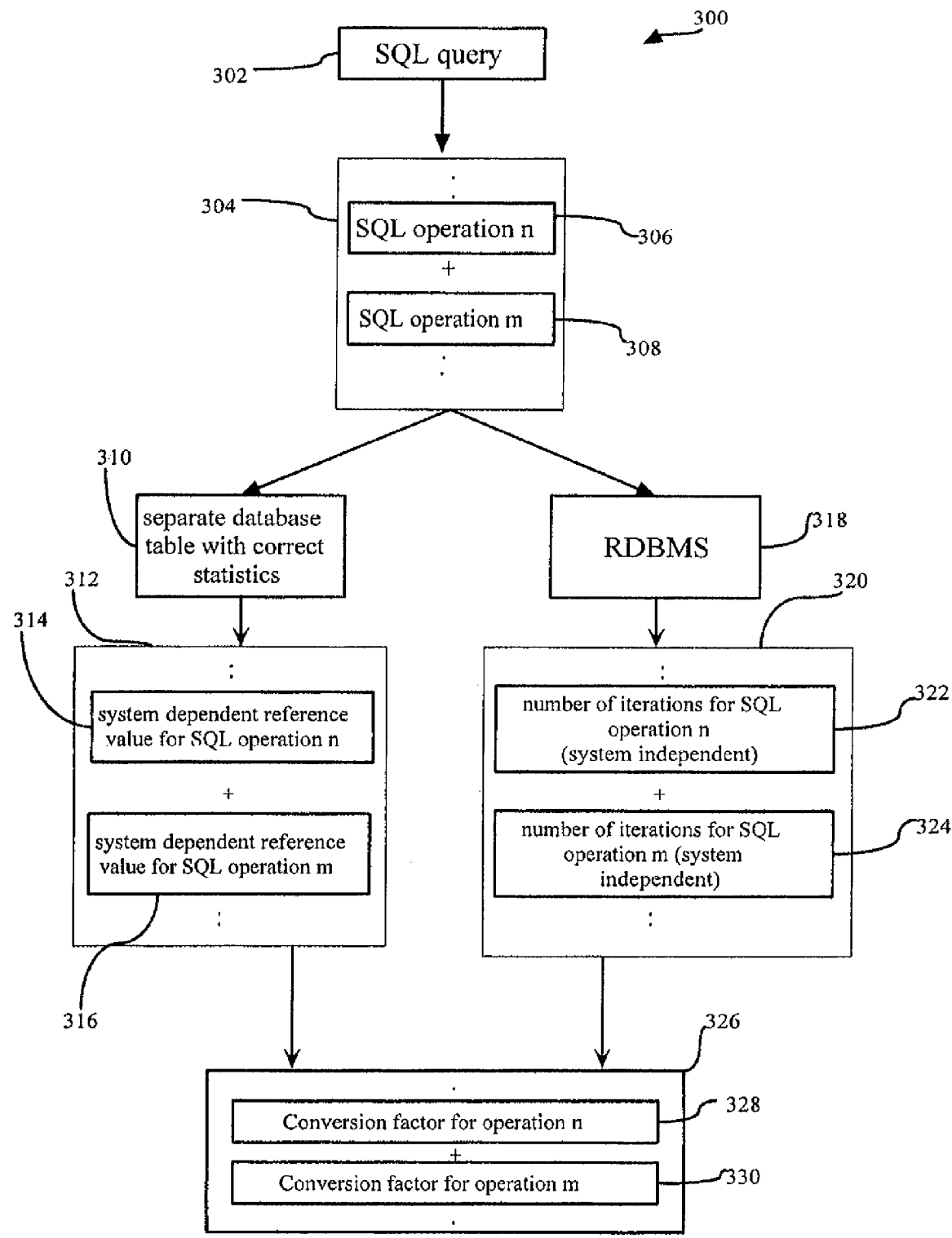
FIG. 3 is a flow diagram illustrating how a system dependent reference value, a system independent reference value, and a conversion factor are determined in accordance with an aspect of the invention.

FIG. 3 is a flow diagram 300 illustrating how to determine a system dependent reference value, a system independent reference value, and a conversion factor for each of at least one SQL operation in an execution plan according to an aspect of the invention. A test execution plan is constructed in a way so that it comprises all SQL operations that may be included in a possible execution plan. The test execution plan is a SQL query 302, which is a sequence of SQL operations 304 comprising, for example, SQL operation n 306, SQL operation m 308, etc. The sequence 304 is executed in step 310 on a separate reference database table. In one implementation of the invention, the separate reference database table is contained in a system similar to the one shown in FIG. 2. In the implementation, the statistics data for this separate reference database table is always up-to-date.

In step 312, the method determines for each SQL operation comprised in the sequence 304, a system dependent reference value. This is done by measuring the CPU time required to execute each SQL operation of the SQL sequence 304 on the separate reference database table. For example, the CPU time required to execute SQL operation n 306 and SQL operation m 308 are measured. The measured CPU times correspond to the system dependent reference value for SQL operation n 314 and SQL operation m 316, respectively. Thus, in step 312, a list of system dependent reference values is determined, whereby each reference value corresponds to one particular SQL operation.

A RDBMS is provided at 318 and at step 320, a system independent reference value is determined for each SQL operation comprised in the sequence 304. As an example, for SQL operation n 306, a system independent reference value 322 is determined by the number of iterations required to perform the operation on the separate reference database table. A system independent reference value 324 is determined for SQL operation m 308 by the number of iterations required to execute the operation. This procedure is carried out for the sequence of all SQL operations 304 comprised in SQL query 302. Thus, in step 320, a list of the system independent reference values is determined, whereby each reference value corresponds to one particular SQL operation.

In step 326, a list of conversion factors is determined, whereby each conversion factor corresponds to one particular SQL operation. A conversion factor relates the system independent reference value to the system dependent reference value of each SQL operation. For example, conversion factor 328 relates the system dependent reference value 314 to the system independent reference value 322 of SQL operation n 306, and conversion factor 330 relates the system dependent reference value 316 to the system independent reference value 324 of SQL operation m 308. As mentioned above, the conversion factors are stored on a memory device. In one embodiment of the invention, a conversion factor is determined by dividing a system independent reference value by a system dependent reference value.

Figure 4:
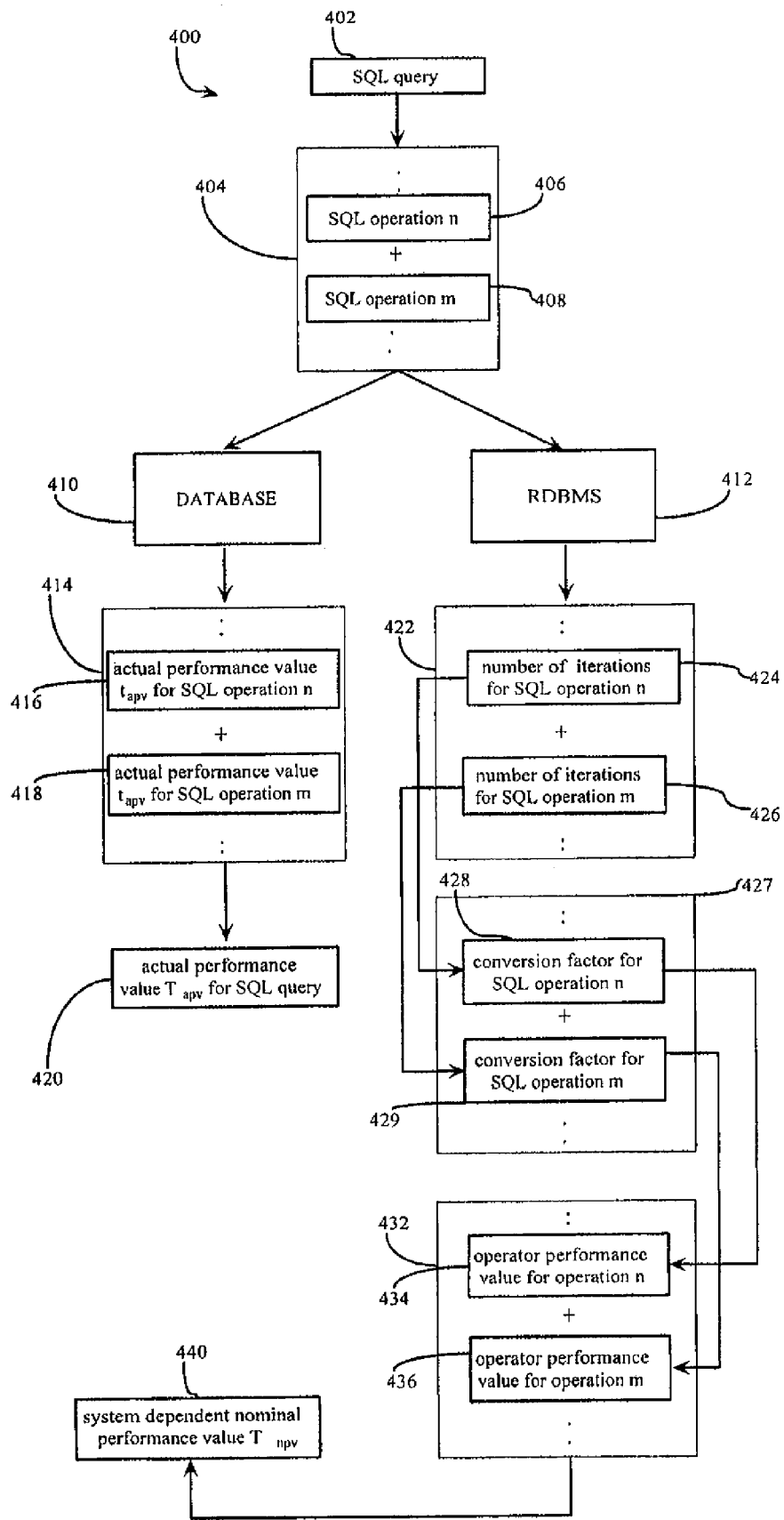
FIG. 4 illustrates in a flow diagram how an actual performance value and a system dependent nominal performance value are determined in accordance with an implementation of the invention.

FIG. 4 illustrates in a flow diagram 400 how an actual performance value of a SQL query 402 is determined in accordance with an implementation of the invention. A query optimizer (not shown) of a RDBMS 412 determines for the SQL query 402 an execution plan 404 comprising a sequence of SQL operations, such as SQL operation n 406, SQL operation m 408, etc. For these SQL operations, the conversion factors have been determined using the steps described above in FIG. 3. The execution plan 404 may not be the optimal execution plan because the data in the database might have changed such that the statistics data no longer reflects the underlying data. The execution plan 404 is processed on a database 410. The method determines for the SQL operations in execution plan 404 a set of performance values 414, such as actual performance value 416, which is the performance value $t_{apv}$ for SQL operation n 406, and actual performance value 418, which is the performance value $t_{apv}$ for SQL operation n 408. An actual performance value $T_{apv}$ 420 for processing the SQL query request 402 on database 410 is determined by summing over all the actual performance values for the SQL operations.

In another embodiment of the invention, the actual performance value for executing the SQL query 402 on database 410 is measured directly by determining the CPU time required to execute the SQL query request 402.

The method tracks the number of times the query request is executed within a given period of time. Using the tracked number of times and the actual performance value required to execute the SQL statement, the method determines an average actual performance value $T_{avg\text{-}apv}$.

The method in FIG. 4 also determines a system dependent nominal performance value $T_{npv}$ 440 for the SQL query 402 by sending the execution plan 404 to the RDBMS 412, which returns for each SQL operation, the number of iterations required to perform the SQL operation, such as the number of iterations 424 for SQL operation n 406 and the number of iterations 426 for SQL operation m 408. Thus, for the sequence of SQL operations in execution plan 404, a sequence of system independent nominal performance values 422 is determined, whereby each system independent nominal performance value relates to one SQL operation. Each system independent nominal performance value corresponds to the number of iterations required to execute the corresponding SQL operation.

As described above, for each SQL operation, a conversion factor has previously been determined. A sequence 427 comprises the conversion factors that have been determined for the SQL operations comprised in the execution plan 404. For example, a conversion factor 428 relates to SQL operation n 406 and a conversion factor 429 relates to SQL operation m 408. From the conversion factors and the number of iterations required for the execution of a SQL operation, system dependent nominal operator performance value can be determined for the SQL operation. For example, from the number of iterations 424 required for the execution of SQL statement n 406 and from the conversion factor 428 for SQL operation n 406, a system dependent nominal operator performance value 434 can be determined for the SQL operation n 406. From the number of iterations 426 required for the execution of SQL operation m 408 and from the conversion factor 429 for SQL operation n 408, a system dependent nominal operator performance value 436 can be determined for the SQL operation m 408. By summing a sequence 432 of all system dependent nominal operator performance values determined for the sequence of SQL operations in execution plan 404, the system dependent nominal performance value $T_{npv}$ 440 is determined.

Figure 5:
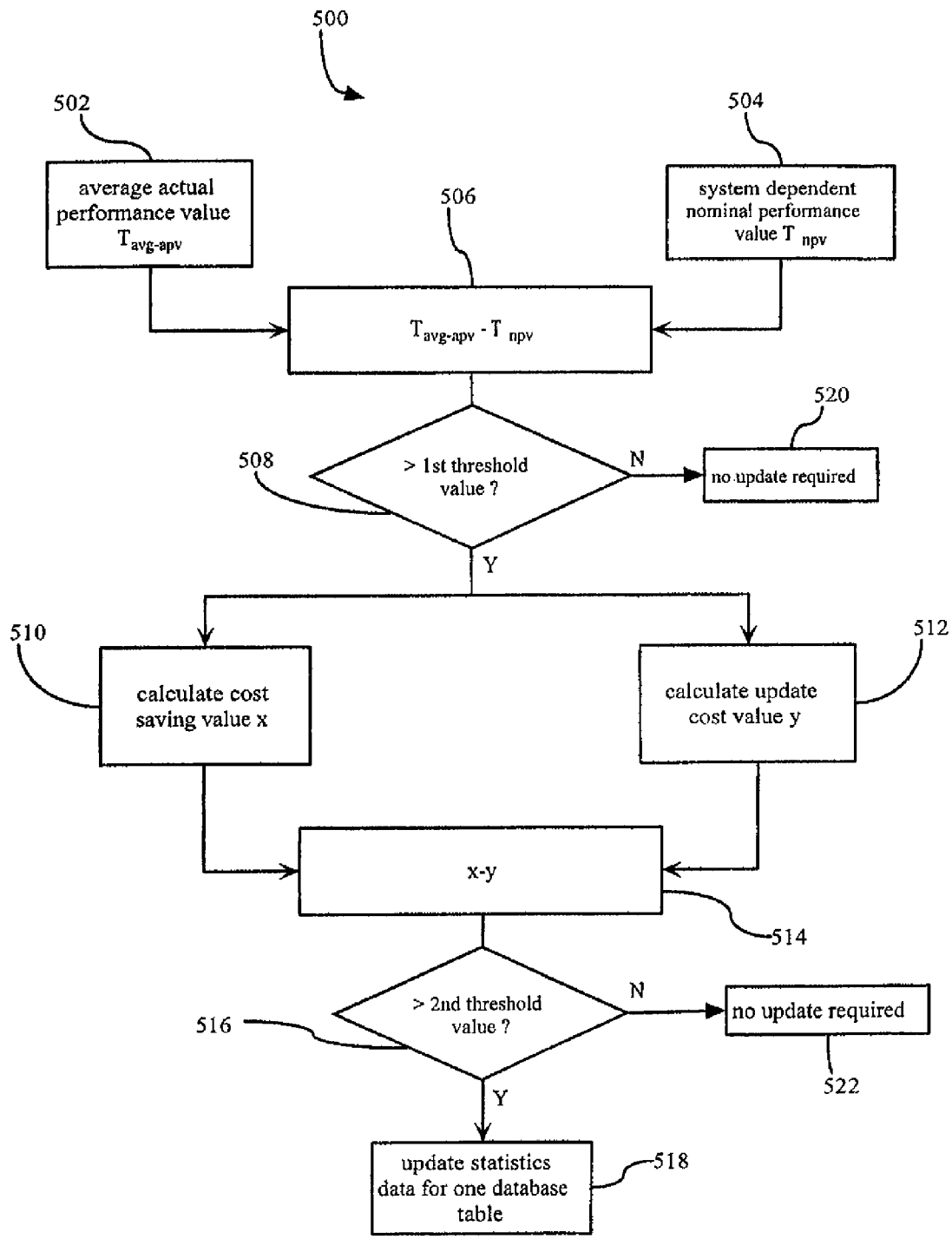
FIG. 5 is a flow diagram depicting steps executed by a method in accordance with one embodiment of the invention for triggering an update of statistics data.

FIG. 5 is a flow diagram 500 depicting a method for triggering an update of statistics data in accordance with an aspect of the invention. An average actual performance value $T_{avg\text{-}apv}$ of a SQL query executed on a database which is used in step 502 is determined as described above in FIG. 4. A system dependent nominal performance value $T_{npv}$ which is used in step 504 is also determined as described above in FIG. 4. In step 506, a comparison is made by taking the difference between $T_{avg\text{-}apv}$ and $T_{npv}$. The method, however, is by no means restricted to this way of comparing the two numbers. Other comparing methods, such as taking a quotient between the average actual performance value and the system dependent nominal performance value may be implemented in another embodiment of the invention.

In step 508, a decision is made as to whether the comparison yields a result that is above a first threshold value. If the answer is no, the method proceeds with step 520 in which no update is triggered. If the answer is yes, then the method proceeds with the steps described in the following. In step 510, a cost saving value is determined and in step 512 an update cost value is determined for each of at least one database table comprised in the database.

The cost saving value quantifies the system performance that could be saved if the RDBMS were to operate with updated statistics. How the cost saving value is determined according to one implementation of the invention is described below. In general, several different query requests accessing the same database table are executed on a database during a given period of time. Here, it is assumed that n different query requests are executed on the database table during the given period of time. Two query requests are different if they differ in the sequence of SQL operations. Each of the n different query requests is executed $N_i$ times within the given period of time, where the index i=1, 2, 3, ..., n is used to distinguish the n different query requests.

For each of the n different query requests, an average actual performance value $T_{avg\text{-}apv,i}$ and a system dependent nominal performance value $T_{npv,i}$ is determined, where the index i=1, 2, 3, ..., n corresponds to the different query requests. The cost saving value is then determined using the following equation:

$$\sum_{i=1}^{n} N_i \times (T_{avg-apv,i} - T_{npv,i})$$

For the calculation of the cost saving value, all query requests executed during the given period of time on the database table are taken into account, even if the difference between the average actual performance value and the system dependent nominal performance value is below the first threshold. The same holds for the calculation of the update cost value.

The update cost value quantifies the system performance required to update the statistics data for one database table. In an embodiment of the invention, the update cost value is the sum of the CPU time required to read data from a database table plus the time required to process statistics data. Both values—the time required to read data from the database table and the time required to process the statistics data—depend on the number of rows in the table of the database. The update cost value is then determined by summing the time required to read a row plus the time required to process the row and by multiplying the sum by the number of rows in the database table.

The number of rows in a database table is obtained from a request to the RDBMS. The time to read one row can be determined by use of a separate reference database table. The statistics data of the database table is updated and the time to read a row and to process a row is measured. Thus, the time to read a row and to process a row is determined by using of the database table.

The method then compares in step 514 the cost saving value with the update cost value. In the embodiment depicted, the comparison 514 is made by taking the difference between the cost saving value and the update cost value. The way of comparing, however, is by no means restricted to this embodiment. Another way to compare the update cost value and the cost saving value, for example, is to take the quotient of the cost saving value and the update cost value.

In step 516, a decision is made as to whether the comparison of step 514 leads to a result which is larger than a second threshold value. The first threshold value and the second threshold value may be constants defined by a user.

If the comparison yields a value that is above the second threshold value, the method proceeds with step 518, whereby the statistics data is updated. If the comparison yields a value that is below the second threshold value, the method proceeds with step 522, whereby an update of statistics data is skipped. In one implementation of the invention, only the statistics data that refers to the database table is updated.

Figure 6:
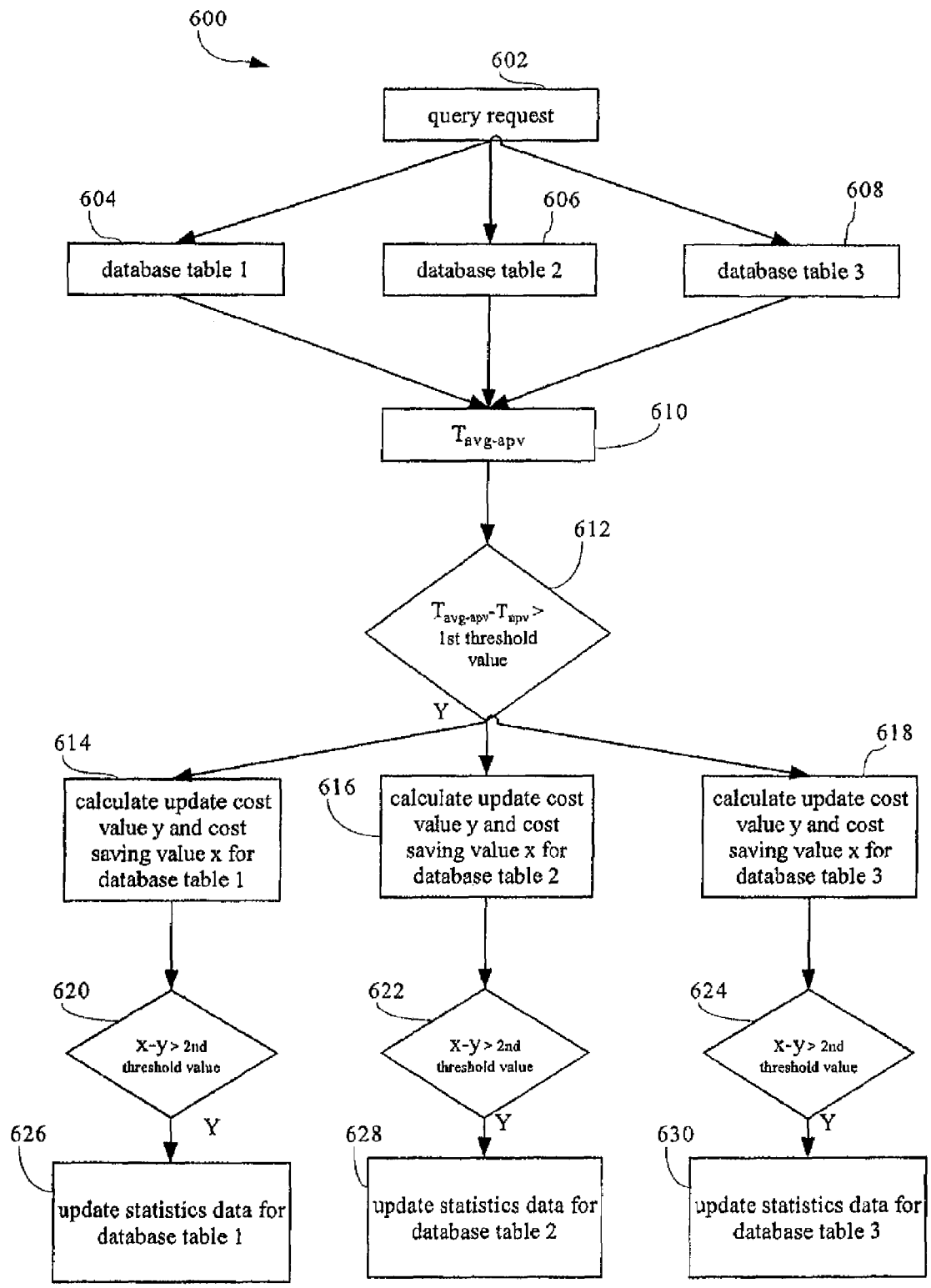
FIG. 6 is a flow diagram depicting one implementation of the invention for triggering an update of statistics data.

FIG. 6 is a flow diagram 600 depicting one embodiment of the invention for triggering an update of statistics data. A query request 602 is executed on database table 1 604, database table 2 606, and database table 3 608 several times during a given period of time. In step 610, an average actual performance value $T_{avg-apv}$ for executing the query request 602 on the three tables 604, 606, and 608 is determined as described above. In step 612, a determination is made as to whether the average actual performance value minus a system dependent nominal performance value $T_{npv}$, which has been determined as described above, is beyond a 1st threshold value. If it is above the 1st threshold value, an update cost value and a cost saving value is calculated for each database table separately in steps 614, 616, and 618, respectively. For the calculation of the cost saving value and the update cost value relating to a database table, not only are the average actual performance value and the system dependent nominal performance value of query request 602 taken into account, but the average actual performance values and the system dependent nominal performance values of all other query requests that have been executed on that database table during the given period of time are also taken into account. For each database table, it is then decided in steps 620, 622, and 624 respectively, if the cost saving value minus the update cost value is beyond a 2nd threshold value. If this is the case for a database table, an update of the statistics data of that database table is triggered in steps 626, 628, and 630.

While the present invention has been described with reference to the above embodiments, the technical scope of the present invention is not limited thereto. It is to be understood by those skilled in the art that various modifications or improvements can be added to the above embodiments. It is apparent from the appended claims that such modified or improved implementations fall within the technical scope of the present invention.

| List of Reference Numerals | |
|---|---|
| 100 | Query request flow |
| 102 | SQL request |
| 104 | RDBMS |
| 105 | Query optimizer |
| 106 | Sequence of SQL operations |
| 107 | Statistics data |
| 108 | SQL operation i |
| 110 | SQL operation j |
| 112 | SQL operation k |
| 114 | Database |
| 200 | Block diagram |
| 202 | Query request |
| 204 | Query optimizer |
| 206 | Execution plan |
| 207 | Test execution plan |
| 208 | Relational database |
| 209 | SQL operation |
| 210 | Number of times |
| 211 | Database table |
| 212 | Statistics data |
| 214 | RDBMS |
| 216 | Reference database table |
| 217 | Up-to-date statistics data |
| 218 | Actual performance value |
| 220 | System independent nominal performance value |
| 222 | System dependent reference value |
| 224 | System independent reference value |
| 226 | Average actual performance value |
| 228 | System dependent nominal performance value |
| 229 | System dependent nominal operator performance value |
| 230 | Conversion factor |
| 231 | Comparison |
| 232 | First threshold value |
| 234 | Update cost value |
| 236 | Cost saving value |
| 238 | Comparison |
| 240 | Second threshold value |
| 242 | Update |
| 250 | Database system |
| 252 | Microprocessor |
| 254 | Volatile memory device |
| 256 | Non-volatile memory device |
| 300 | Flow diagram |
| 302 | SQL query |
| 304 | Sequence of SQL operations |
| 306 | SQL operation n |
| 308 | SQL operation m |
| 310 | Execute query on separate database table |
| 312 | Determine list |
| 314 | System dependent reference value for SQL operation n |
| 316 | System dependent reference value for SQL operation m |
| 318 | RDBMS |
| 320 | Determine list |

-continued

| | List of Reference Numerals |
|---|---|
| 322 | Number of iterations for SQL operation n |
| 324 | Number of iterations for SQL operation m |
| 326 | Determine list of conversion factors |
| 328 | Conversion factor for SQL operation n |
| 330 | Conversion factor for SQL operation m |
| 400 | Flow diagram |
| 402 | SQL query |
| 404 | Sequence of SQL operations/Execution plan |
| 406 | SQL operation n |
| 408 | SQL operation m |
| 410 | Database |
| 412 | RDBMS |
| 414 | Sequence of actual performance values of the SQL operations |
| 416 | Actual performance value for SQL operation n |
| 418 | Actual performance value for SQL operation m |
| 420 | Actual performance value for SQL query |
| 422 | Sequence |
| 424 | Number of iterations for SQL operation n |
| 426 | Number of iterations for SQL operation m |
| 427 | Sequence |
| 428 | Conversion factor for SQL operation n |
| 429 | Conversion factor for SQL operation m |
| 432 | Sequence |
| 434 | System dependent nominal operator performance value for SQL operation n |
| 436 | System dependent nominal operator performance value for SQL operation m |
| 440 | System dependent nominal performance value |
| 500 | Flow diagram |
| 502 | Average actual performance value |
| 506 | System dependent nominal performance value |
| 506 | Comparison |
| 508 | Decision |
| 510 | Calculate cost saving value |
| 512 | Calculate update cost value |
| 514 | Comparison |
| 516 | Decision |
| 518 | Trigger update of statistics data |
| 520 | No update required |
| 522 | No update required |
| 600 | Flow diagram |
| 602 | Query request |
| 604 | Database table 1 |
| 606 | Database table 2 |
| 608 | Database table 3 |
| 610 | Determine $T_{avg-apv}$ |
| 612 | Decision |
| 614 | Calculation |
| 616 | Calculation |
| 618 | Calculation |
| 620 | Decision |
| 622 | Decision |
| 624 | Decision |
| 626 | Trigger update |
| 628 | Trigger update |
| 630 | Trigger update |

What is claimed is:

1. A method for triggering an update of statistics data used by a query optimizer of a relational database management system (RDBMS) for executing a query request on a relational database, the query request comprising at least one SQL operation, wherein the relational database comprises at least one database table and a reference database table with up-to-date statistics data, the method comprising:
determining a system independent reference value for each of the at least one SQL operation using the up-to-date statistics data;
determining a system dependent reference value for each of the at least one SQL operation by executing the SQL operation on the reference database table;
calculating a conversion factor for each of the at least one SQL operation, the conversion factor being operable to relate the system independent reference value to the system dependent reference value;
determining a system independent nominal performance value for each of the at least one SQL operation;
determining a system dependent nominal operator performance value for each of the at least one SQL operation based on the system independent nominal performance value and the conversion factor;
determining a system dependent nominal performance value for the query request based on the system dependent nominal operator performance value of each of the at least one SQL operation;
measuring an actual performance value by executing the query request on the at least one database table of the relational database;
tracking the number of times the query request is executed within a given period of time;
determining an average actual performance value from the measured actual performance values of the query request executed within the period of time and from the tracked number of times;
comparing the average actual performance value with the system dependent nominal performance value;
calculating for each of the at least one database table an update cost value;
calculating for each of the at least one database table a cost saving value;
comparing the update cost value with the cost saving value for each of the at least one database table; and
updating the statistics data.

2. The method of claim 1, wherein the system independent reference value and the system independent nominal performance value for each of the at least one SQL operation are based on a number of iterations required to carry out the SQL operation.

3. The method of claim 1, wherein the system dependent reference value, the system dependent nominal operator performance value, the system dependent nominal performance value, the actual performance value, the average actual performance value, the update cost value, and the cost saving value are in computer processing unit (CPU) time.

4. The method of claim 1, wherein comparing the average actual performance value with the system dependent nominal performance value comprises:
calculating a difference between the average actual performance value and the system dependent nominal performance value or a quotient between the average actual performance value and the system dependent nominal performance value.

5. The method of claim 1, wherein calculation of the update cost value and the cost saving value, comparison of the update cost value with the cost saving value, and update of the statistics data are performed in response to the comparison of the average actual performance value with the system dependent nominal performance value being above a first threshold value.

6. The method of claim 1, wherein comparing the update cost value with the cost saving value comprises:
calculating a difference between the cost saving value and the update cost value or a quotient between the cost saving value and the update cost value.

7. The method of claim 1, wherein update of the statistics data is performed in response to the comparison of the update cost value with the cost saving value being above a second threshold value.

8. The method of claim 1, wherein update of the statistics data is performed in response to a user request.

9. A system for triggering an update of statistics data used by a query optimizer of a relational database management system (RDBMS) for executing a query request on a relational database, the query request comprising at least one SQL operation, wherein the relational database comprises at least one database table and a reference database table with up-to-date statistics data, the system comprising:
- means for determining a system independent reference value for each of the at least one SQL operation using the up-to-date statistics data;
- means for determining a system dependent reference value for each of the at least one SQL operation by executing the SQL operation on the reference database table;
- means for calculating a conversion factor for each of the at least one SQL operation, the conversion factor being operable to relate the system independent reference value to the system dependent reference value;
- means for determining a system independent nominal performance value for each of the at least one SQL operation;
- means for determining a system dependent nominal operator performance value for each of the at least one SQL operation based on the system independent nominal performance value and the conversion factor;
- means for determining a system dependent nominal performance value for the query request based on the system dependent nominal operator performance value of each of the at least one SQL operation;
- means for measuring an actual performance value by executing the query request on the at least one database table of the relational database;
- means for tracking the number of times the query request is executed within a given period of time;
- means for determining an average actual performance value from the measured actual performance values of the query request executed within the period of time and from the tracked number of times;
- means for comparing the average actual performance value with the system dependent nominal performance value;
- means for calculating for each of the at least one database table an update cost value;
- means for calculating for each of the at least one database table a cost saving value;
- means for comparing the update cost value with the cost saving value for each of the at least one database table; and
- means for updating the statistics data.

10. The system of claim 9, wherein the system independent reference value and the system independent nominal performance value for each of the at least one SQL operation are based on a number of iterations required to carry out the SQL operation.

11. The system of claim 9, wherein the system dependent reference value, the system dependent nominal operator performance value, the system dependent nominal performance value, the actual performance value, the average actual performance value, the update cost value, and the cost saving value are in computer processing unit (CPU) time.

12. The system of claim 9, wherein means for comparing the average actual performance value with the system dependent nominal performance value comprises:
- means for calculating a difference between the average actual performance value and the system dependent nominal performance value or a quotient between the average actual performance value and the system dependent nominal performance value.

13. The system of claim 9, wherein calculation of the update cost value and the cost saving value, comparison of the update cost value with the cost saving value, and update of the statistics data are performed in response to the comparison of the average actual performance value with the system dependent nominal performance value being above a first threshold value.

14. The system of claim 9, wherein means for comparing the update cost value with the cost saving value comprises:
- means for calculating a difference between the cost saving value and the update cost value or a quotient between the cost saving value and the update cost value.

15. The system of claim 9, wherein update of the statistics data is performed in response to the comparison of the update cost value with the cost saving value being above a second threshold value.

16. A computer program product comprising a computer readable medium, the computer readable medium including a computer readable program for triggering an update of statistics data used by a query optimizer of a relational database management system (RDBMS) for executing a query request on a relational database, the query request comprising at least one SQL operation, the relational database comprising at least one database table and a reference database table with up-to-date statistics data, wherein the computer readable program when executed on a computer causes the computer to:
- determine a system independent reference value for each of the at least one SQL operation using the up-to-date statistics data;
- determine a system dependent reference value for each of the at least one SQL operation by executing the SQL operation on the reference database table;
- calculate a conversion factor for each of the at least one SQL operation, the conversion factor being operable to relate the system independent reference value to the system dependent reference value;
- determine a system independent nominal performance value for each of the at least one SQL operation;
- determine a system dependent nominal operator performance value for each of the at least one SQL operation based on the system independent nominal performance value and the conversion factor;
- determine a system dependent nominal performance value for the query request based on the system dependent nominal operator performance value of each of the at least one SQL operation;
- measure an actual performance value by executing the query request on the at least one database table of the relational database;
- track the number of times the query request is executed within a given period of time;
- determine an average actual performance value from the measured actual performance values of the query request executed within the period of time and from the tracked number of times;
- compare the average actual performance value with the system dependent nominal performance value;
- calculate for each of the at least one database table an update cost value;
- calculate for each of the at least one database table a cost saving value;
- compare the update cost value with the cost saving value for each of the at least one database table; and
- update the statistics data.

17. The computer program product of claim 16, wherein the system independent reference value and the system independent nominal performance value for each of the at least one SQL operation are based on a number of iterations required to carry out the SQL operation.

18. The computer program product of claim 16, wherein the system dependent reference value, the system dependent nominal operator performance value, the system dependent nominal performance value, the actual performance value, the average actual performance value, the update cost value, and the cost saving value are in computer processing unit (CPU) time.

19. The computer program product of claim 16, wherein compare the average actual performance value with the system dependent nominal performance value comprises:
calculate a difference between the average actual performance value and the system dependent nominal performance value or a quotient between the average actual performance value and the system dependent nominal performance value.

20. The computer program product of claim 16, wherein calculation of the update cost value and the cost saving value, comparison of the update cost value with the cost saving value, and update of the statistics data are performed in response to the comparison of the average actual performance value with the system dependent nominal performance value being above a first threshold value.

21. The computer program product of claim 16, wherein compare the update cost value with the cost saving value comprises:
calculate a difference between the cost saving value and the update cost value or a quotient between the cost saving value and the update cost value.

22. The computer program product of claim 16, wherein update of the statistics data is performed in response to the comparison of the update cost value with the cost saving value being above a second threshold value.

* * * * *